United States Patent [19]

Matthews

[11] 3,950,953

[45] Apr. 20, 1976

[54] PILING FENDER

[76] Inventor: Joseph E. Matthews, 4017 N. Witchduck, Virginia Beach, Va. 23455

[22] Filed: Nov. 18, 1974

[21] Appl. No.: 525,025

[52] U.S. Cl.................................. 61/48; 114/219
[51] Int. Cl.².................................... B63B 59/02
[58] Field of Search............ 61/48; 114/219; 256/1, 256/13.1; 293/60, 87; 267/139, 140, 141

[56] References Cited
UNITED STATES PATENTS

| 2,935,855 | 5/1960 | Reid................................ 114/219 X |
| 2,986,419 | 5/1961 | Barenyi........................... 114/219 X |
| 3,225,731 | 12/1965 | McCulley.......................... 114/219 |
| 3,372,552 | 3/1968 | Liddell............................. 61/48 X |
| 3,411,304 | 11/1968 | Miller................................ 61/48 |
| 3,638,985 | 2/1972 | Barton et al..................... 114/219 X |
| 3,820,495 | 6/1974 | Ueda................................ 114/219 |

FOREIGN PATENTS OR APPLICATIONS 374,088   6/1932   United Kingdom................ 114/219

Primary Examiner—Dennis L. Taylor
Attorney, Agent, or Firm—Robert G. McMorrow

[57] ABSTRACT

A piling fender is formed of non-rigid materials and has an inner face shaped for engagement against the piling and an opposite outwardly extended crown. A bore is formed within the fender behind the crown to permit compression. Outwardly extended wing flaps have projecting corners and the outer surface of the fender is concave between the crown and the projecting corners. Fasteners are extended through the wing flaps between the crown and the projecting corners.

1 Claim, 4 Drawing Figures

PILING FENDER

BACKGROUND OF THE INVENTION

1. Field of the Invention

This invention relates to a piling fender for a dock piling or the like.

2. Statement of the Prior Art:

Piling fenders formed of rubber or similar material have long been known. Examples of such previously known devices are shown in the following U.S. Pat. Nos.:

| Patent Number | Patentee | Issue Date |
| --- | --- | --- |
| 3,014,710 | Layne | Dec. 26, 1961 |
| 3,121,997 | Sampson | Feb. 25, 1964 |
| 3,372,552 | Liddell | March 12, 1968 |
| 3,449,917 | Roskopf | June 17, 1969. |

SUMMARY OF THE INVENTION

This invention pertains to an improved flexible fender attached to a piling for protection of the piling and for protection of watercraft which encounter or come into contact with the piling. It has long been known to apply resilient materials of one type or another to pilings. Often, discarded fire hose, automobile tires, or other similar materials are used for this purpose. However, on occasion such materials are unsatisfactory and do not furnish adequate protection. Damage often occurs as a result of contact by the boat with the fastening means employed to connect the fender to the piling. It is therefore a principal objective of this invention to provide a piling fender in which the fastening means is so located as to obviate the possibility of contact with a vessel which is moored against the piling and to thus avoid damage to such vessels.

A further and related object of the invention is to provide a fender as aforesaid which is constructed to accommodate the piling hardward which normally exists, such as transverse connection bolt assemblies.

Additional advantages of the piling fender hereof include neatness of appearance, low cost, ease of installation, and general effectiveness for the indicated purpose.

Other and further objects and advantages of the invention will become apparent to those skilled in the art from a consideration of the following specification when read in conjunction with the annexed drawing.

Figure 1:
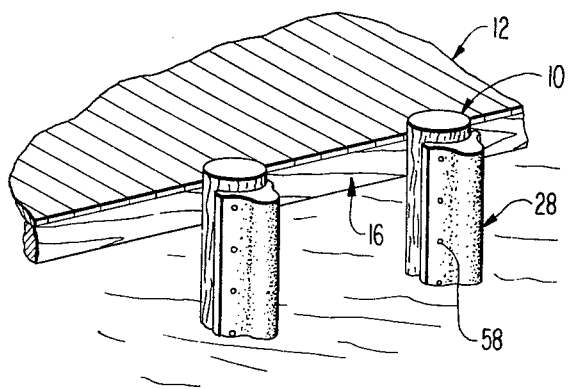
FIG. 1 is a perspective view showing a section of dock or pier with two pilings equipped with fenders in accordance with this invention.
Figure 3:
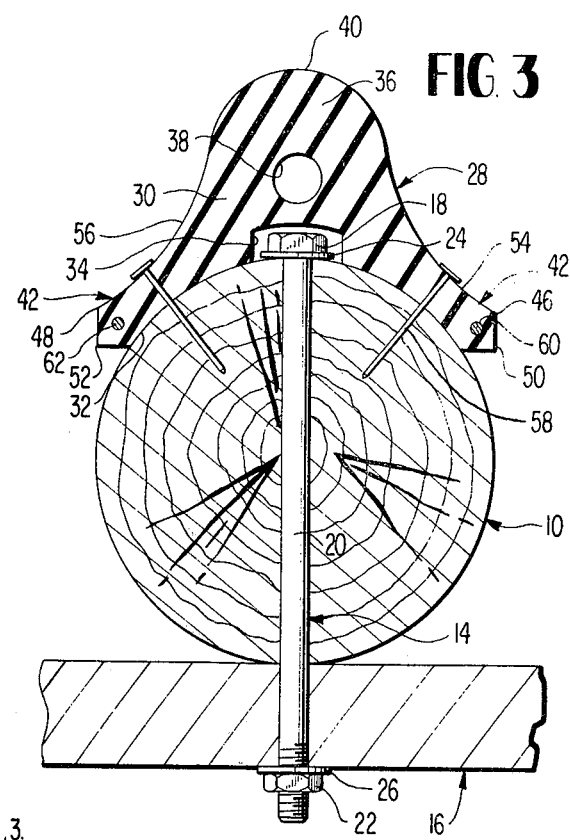
FIG. 3 is a transverse cross-sectional view taken substantially on line 3—3 of FIG. 2, looking in the direction of the arrows.
Figure 2:
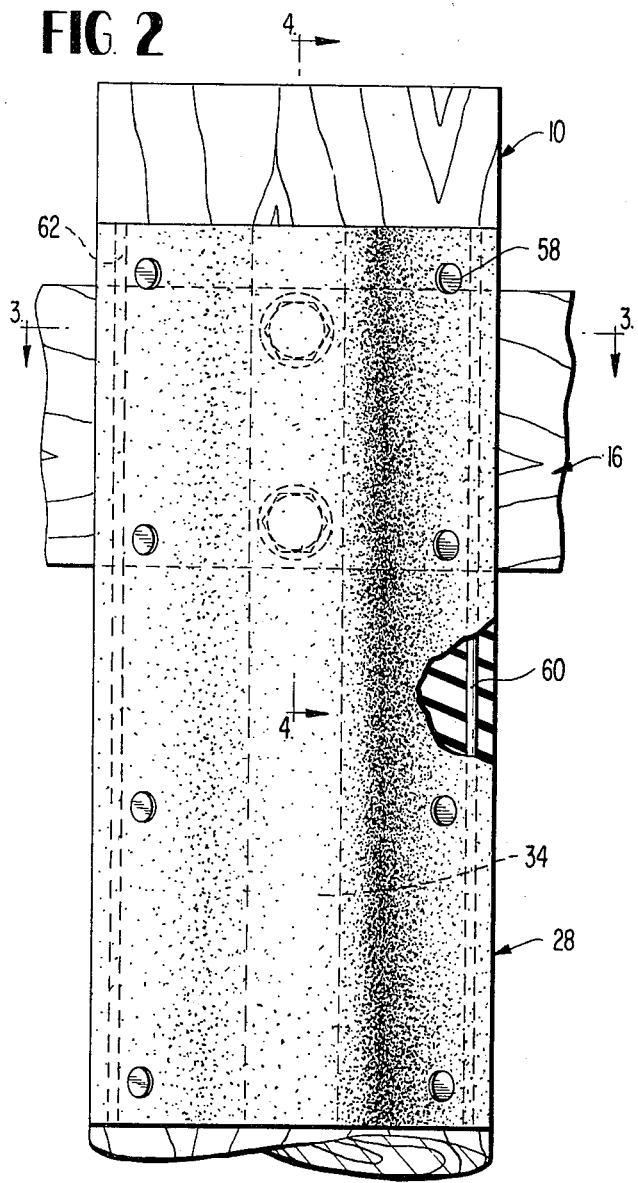
FIG. 2 is an enlarged front elevational view, partially broken away for disclosure of details, of a piling with a fender thereon.
Figure 4:
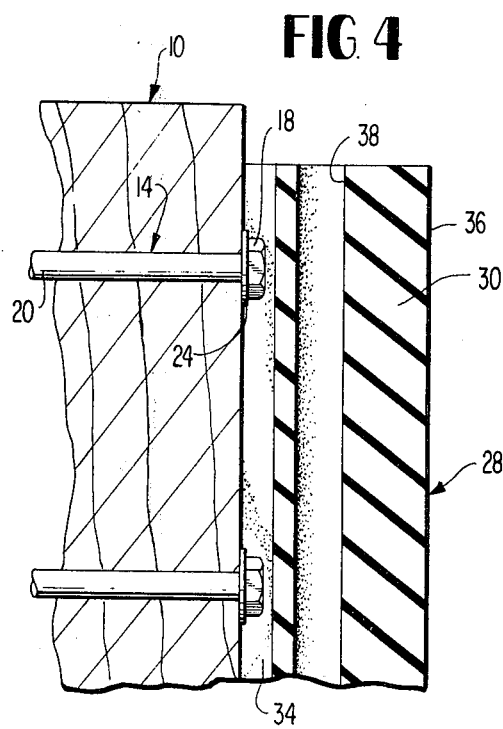
FIG. 4 is an enlarged sectional view showing details on line 4—4 of FIG. 2, looking in the direction of the arrows.

DESCRIPTION OF THE PREFERRED EMBODIMENT:

The environment of use of this invention is normally a piling 10 on a dock or pier 12 to which watercrafts are moored. The pier 12 is supported on a series of pilings 10 and is joined thereto by a plurality of bolts 14 which extend through the pilings and through longitudinal whalers 16 of the pier. For purposes of description hereinafter, the bolts each have a head 18 which projects outwardly from the piling and an elongated bolt shaft 20 which extends through the openings in the pilings and whalers to a location inside the whalers. A nut 22 clamps the piling to the whaler, and suitable washers 24, 26 are located between the head 18 and the piling 10, and nut 22 and whaler 16.

The piling fender is generally identified in the drawing by reference character 28 and comprises an elongated unitary fender body portion 30 formed of rubber or other flexible or non-rigid material. The fender includes a concave inner face 32 which is shaped for engagement against the piling 10. Opening on the inner face 32 is a vertically extending chamber 34 of a width and depth to permit the fender body portion to fit about the bolt heads 18 and washers 24. The chamber is formed in the body portion to extend vertically throughout the height of the body portion.

The body portion is of symmetrical cross section and has an enlarged, outwardly projecting crown portion 36 opposite the inner face. A vertically extending bore 38 is formed in the body portion between the crown and the bolt heads, to permit further compression of the body portion in that area.

Proceeding to a further important feature of the invention, it will be observed that the crown portion 36 has a rounded outer surface 40. The fender body portion further includes side wing flap portions 42 and 44 of opposite form. Each of said wing flap portions has an outwardly projecting corner edge portion 46, 48, each having a squared corner 50 and 52. The wing flap portions have outer surfaces 54, 56 which are concave between the crown portion outer surface 40 and the outwardly extending corners 50 and 52.

A series of nails 58 or equivalent fastening means, extend through the concave section of the wing flap portions and into the pilings. In order to maintain the integrity of configuration of the outwardly extended corner portions in periods of extended usage, rigidifying rods 60, 62 are embedded therein in vertical fashion.

It will be noted from the foregoing that the fastening means are thus located within the section which protects any watercraft contact therewith by virtue of the fact that such contact would necessarily involve the crown 36, or in extreme situations, the outer surface of the crown and the extended corner portions of the wing flap portions.

I claim:

1. A piling fender for use on a piling of substantially cylindrical form, the piling having a series of bolts extending therethrough, the piling fender comprising:
   an elongated fender body portion formed of flexible material;
   the fender body portion having a concave inner face adapted for engagement against the piling;
   the fender body portion having an elongated vertically extending chamber formed therein opening on said inner face, with said bolts projecting into the chamber;

the fender body portion having an enlarged outer crown portion, there being a vertically extending bore formed in the fender body portion between the crown portion and the inner face to permit compression of said crown portion upon impact;

the crown portion having a rounded outer surface;

outwardly extending wing flap portions on opposite sides of said crown portion, each of said wing flap portions having an outwardly extended corner;

the wing flap portions having outer surfaces and being concave between the crown portion outer surface and the outwardly extended corners;

a series of nails extending through the wing flap portions and into the piling;

rigidifying rods embedded in the wing flap portions adjacent said outwardly extending corners, and extending vertically in said wing flap portions; and said nails extending through the wing flap portions inboard of the rigidifying rods and outwardly extending corners whereby watercraft are protected from contact with said nails.

* * * * *